Jan. 24, 1967    F. R. KISHLINE    3,300,229
STEERING COLUMN ARRANGEMENT
Filed May 24, 1965    2 Sheets-Sheet 2
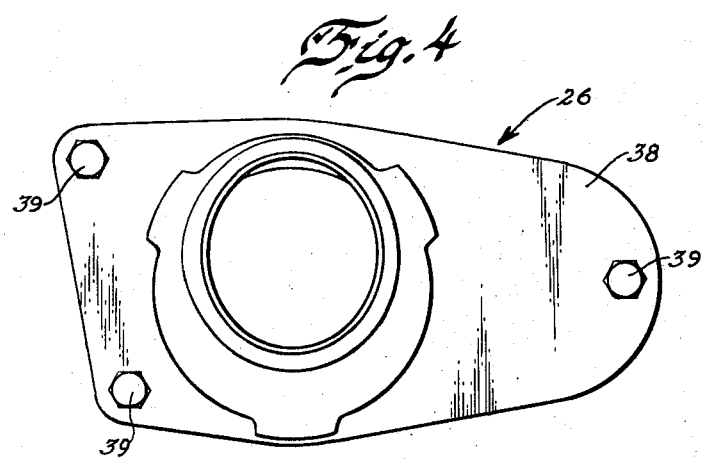
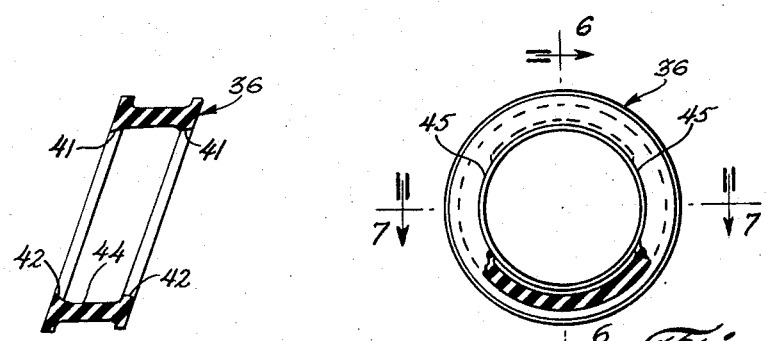
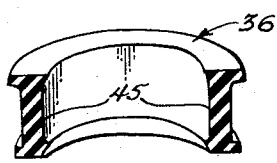
INVENTOR.
FLOYD RICHARD KISHLINE
BY
Carl J. Barbee
ATTORNEY

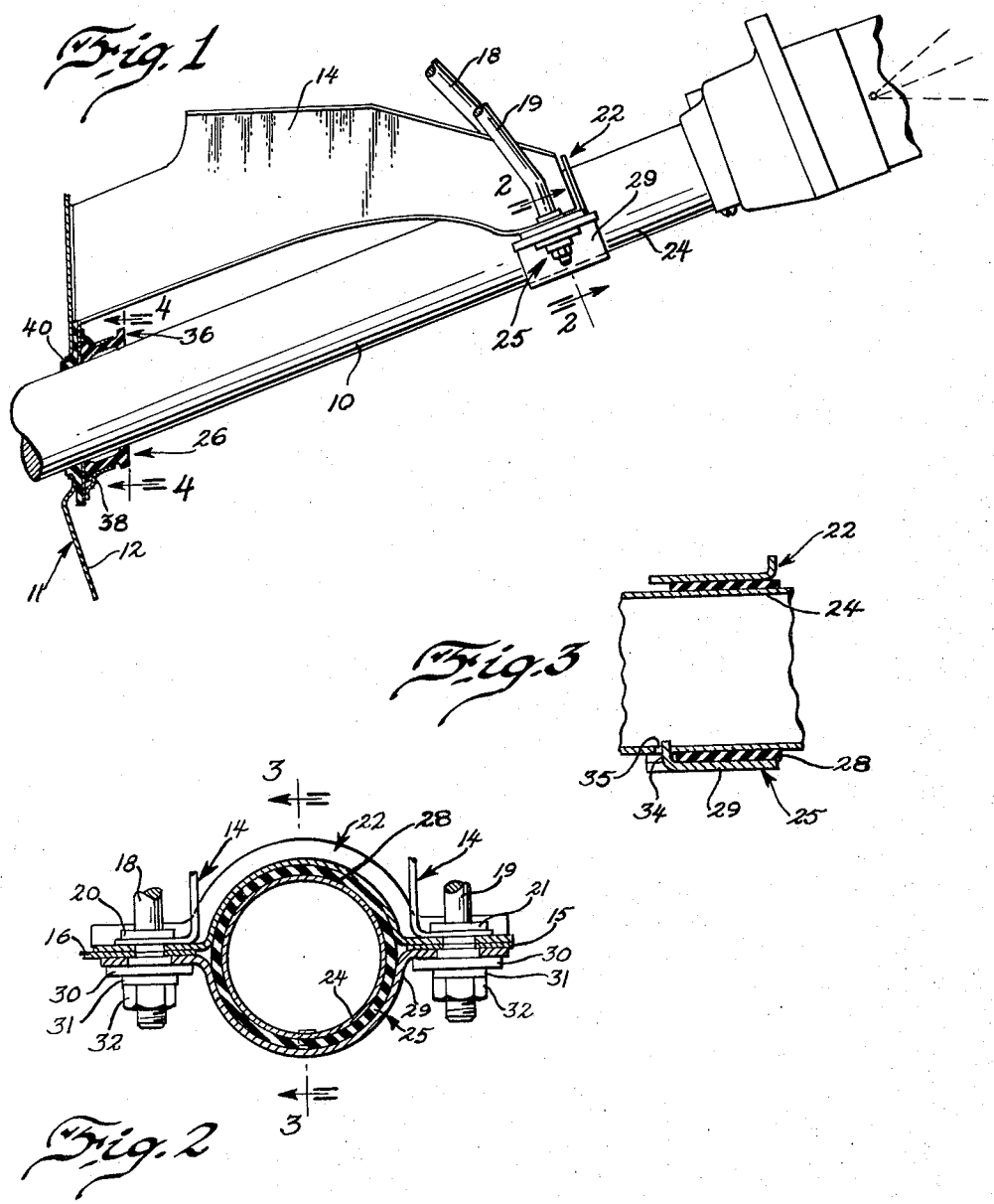

3,300,229
STEERING COLUMN ARRANGEMENT
Floyd Richard Kishline, Kenosha, Wis., assignor to American Motors Corporation, Kenosha, Wis., a corporation of Maryland
Filed May 24, 1965, Ser. No. 457,948
9 Claims. (Cl. 280—87)

This invention relates generally to steering column arrangements for vehicles and more particularly to an improvement in an arrangement utilizing at least one resilient support of a pair of supports.

The steering column for a vehicle is conventionally attached thereto by a pair of spaced brackets. The upper bracket secures the column to the vehicle in the area of the instrument panel and the lower bracket connects the column to the toeboard. Rubber or the like is frequently interposed between the brackets and the column primarily to eliminate noise resulting from small relative movements therebetween.

With the advent of heavier columns incorporating manual shifting components, automatic drive controls, or more particularly, mechanically adjustable features and because of greater column overhang due to space restrictions for supports, a greater degree of sophistication is required to provide arrangement to control column "shake." Specifically, applicant's arrangement is designed to lower the natural frequency of a pitching mode of the column caused by road shock to the vehicle from the natural frequency of the vehicle body to prevent vibration reinforcement thereof. In addition, the arrangement must provide sufficient rigidity to prevent excessive column deflection resulting primarily from forces applied by the driver. Although the arrangement is intended for use with vehicles having unitized bodies, it is to be understood that it is not limited thereto.

Applicant has achieved these goals by providing an upper support bracket that tightly secures the column to the vehicle in the instrument panel area with preferably a resilient sleeve therebetween. A slot in the column is engaged by a projection of the bracket to prevent longitudinal and rotational movement of the column. The pitching of the column about this support is restrained by the lower support. The lower resilient support has a metal bracket on its exterior which is attached to the toeboard with elastomeric material therebetween. The column extends through a passage in the lower resilient support. This support passage is preferably defined at its entrance and exit with upper and lower flange-like projections that contact the column. The flanges are designed to allow a controlled amount of flexibility to lower the natural frequency of the vertical pitching mode of the steering column. Side pads between the entrance and exit flanges divide same into upper and lower flanges and also restrain lateral movement of the column. Excessive vertical column deflection is prevented by an annular surface between the flanges that surrounds the column but is located radially outward therefrom and which restrains the column after same has deflected a predetermined amount. Testing of the above-detailed column arrangement has demonstrated a substantial reduction in column "shake." For example, a bending mode natural frequency of a unitized body excited by road shock is 18 cycles per second whereas the improved column arrangement reduces the frequency of the column to 14 c.p.s. thereby detuning and reducing the "shake" of the column. The column "shake" can be reduced further by selection of elastomeric materials for the column supports having suitable dampening properties.

Although the column arrangement heretofore detailed primarily relates to reducing the pitching mode "shake" in the vertical plane, it is to be understood that similar results could be obtained in other modes. For example, the natural frequency of pitching in a diagonal plane resulting in lateral column movement could be detuned by suitable placement of the flanges in the lower support.

It is, therefore, an object of this invention to provide a new and improved steering column arrangement.

Another object of this invention is to provide a steering column arrangement which lowers the natural frequency of a pitching mode of the steering column from that of the vehicle.

Another object of this invention is to provide a lower resilient column support which lowers the natural frequency of a pitching mode of the steering column about the upper support from that of the vehicle.

Other objects and advantages will become apparent from the following description in conjunction with the attached drawings in which:

FIGURE 1 is a side view, partially in section, of the steering column arrangement of this invention mounted in a vehicle.

FIGURE 2 is a section taken along line 2—2 of FIGURE 1.

FIGURE 3 is a section taken along line 3—3 of FIGURE 2.

FIGURE 4 is a view taken along line 4—4 of FIGURE 1 but with the steering column removed.

FIGURE 5 is a front view, partially in section, of the lower resilient support of the arrangement.

FIGURE 6 is a section taken along line 6—6 of FIGURE 5.

FIGURE 7 is a section taken along line 7—7 of FIGURE 5.

Referring to FIGURES 1 and 2, 10 indicates generally a vehicle steering column arrangement installed on a vehicle 11. Vehicle 11 has a toeboard 12. Attached to toeboard 12 by capscrews or the like is bracket 14 which supports the clutch (when required) and the brake pedal (not shown). Bracket 14 also extends rearwardly from the toeboard 12 and provides support at the end remote therefrom to the vehicle instrument panel (not shown) and to the steering column arrangement 10. Reinforcing members 15 and 16, which are best shown in FIGURE 2, are connected to the vehicle instrument panel by welding or the like. Members 15 and 16 also have slotted holes therethrough for elongated studs 18 and 19 respectively. Each stud is attached to the underside of the instrument panel (not shown) at an end remote from bracket 14. Integral washers 20 and 21 on studs 18 and 19 respectively bear against bracket 14 which has slotted holes therethrough for alignment with the holes in members 15 and 16. Interposed between bracket 14 and members 15 and 16 is element 22 which also has slotted holes for studs 18 and 19.

Steering column arrangement 10 includes a steering column 24 and an upper support assembly 25 located in the area of the vehicle instrument panel and a lower support assembly 26 located at the vehicle toeboard. Although not limited thereto, the steering column 24 of arrangement 10 illustrates a relatively heavy mechanically adjustable column. As shown by the dotted lines, the steering wheel (not shown) is adjustable to upward and downward positions in addition to the normal driving position.

Upper support assembly 25 of arrangement 10 includes a sleeve 28 made of rubber or other resilient material encircling column 24. Strap 29 having slotted holes for the extension therethrough of studs 18 and 19 surrounds sleeve 28 on the side opposite element 22. Washers 30, lockwashers 31 and nuts 32 on studs 18 and 19 secure upper support assembly 25 to the vehicle instrument panel. Strap 29 also has a projection 34, as shown best in FIGURE 3, which engages aperture 35 in column 24 to prevent axial or rotational movement of column 24.

Lower support assembly 26, as best shown in FIGURES 1 and 4, includes a grommet 36 made of resilient material such as rubber which surrounds column 24. The exterior of grommet 36 is adapted for engagement by mounting structure 38. Structure 38 by virtue of capscrews 39 is secured to toeboard 12 with a highly flexible elastomeric gasket 40 located therebetween. Grommet 36, as best illustrated in FIGURES 5, 6 and 7, has a pair of spaced upper and lower internal flanges 41 and 42 respectively which are adapted to contact the upper and lower surfaces of column 24. Annular surface 44 connects the upper flanges 41 and the lower flanges 42 but is located radially outward therefrom. Spaced pads 45 (note the shading in FIGURE 7) extend from annular surface 44 inwardly and are adapted to contact the sides of column 24. Each pad 45 substantially creates an upper and lower flange of each pair of flanges.

In operation, as the vehicle encounters road obstructions, the resulting shocks cause the vehicle to vibrate at its natural frequency. The column 24 due to its substantial mass also starts to vibrate in substantially a vertical plane generally about upper support assembly 25. Flanges 41 and 42 of unique grommet 36 of the lower assembly 26 are designed to lower the natural frequency of the column's pitching mode from the natural frequency of the vehicle to prevent vibration reinforcement thereof. Annular surface 44 of grommet 36 provides high stiffness to eliminate excessive column deflection when the column has bottomed through the flanges due to severe shocks or to forces applied by the driver. Grommet pads 45 provide high lateral stiffness to limit lateral deflection of the column. The column support arrangement 10 with the included unique grommet 36 effectively lessens column "shake" while providing sufficient rigidity for normal vehicle operation.

Having thus described the invention, it will be apparent to those skilled in the art that various modifications and changes can be made without departing from the spirit of the invention or the scope of the appended claims.

I claim:

1. A steering column arrangement for a vehicle comprising:
   (a) a vehicle steering column;
   (b) an upper support means for connecting said column to the vehicle in the area of the instrument panel of the vehicle;
   (c) a lower resilient support means for connecting said column to the vehicle in the area of the toeboard of the vehicle, said lower means having a passage therethrough for the positioning in said passage of said column, said passage being defined by an inner peripheral flange presenting an innermost surface and a pair of generally oppositely facing side surfaces, at least one of said side surfaces being joined at its outer end with an annular surface extending away from said flange and surrounding said passage, said flange contacting and supporting said column and being adapted to provide controlled flexibility to lower the natural frequency of a pitching mode of said column from the natural frequency of the vehicle and said lower means being adapted to provide high stiffness when said annular surface is contacted by said column.

2. The steering column arrangement of claim 1 further comprising:
   (a) a resilient sleeve surrounding said column and located between said upper support means and said column.

3. A steering column arrangement for a vehicle comprising:
   (a) a vehicle steering column;
   (b) an upper support means for connecting said column to the vehicle in the area of the instrument panel of the vehicle;
   (c) a lower resilient support means for connecting said column to the vehicle in the area of the toeboard of the vehicle, said lower means having a passage therethrough for the positioning in said passage of said column, said passage being defined at its entrance and exit by spaced inner peripheral flanges, each flange presenting an innermost surface and a pair of generally oppositely facing side surfaces, the side surfaces of the two flanges which face each other each being joined at their outer ends by an annular surface extending between said flanges and surrounding said passage, said flanges contacting and supporting said column and being adapted to provide controlled flexibility to lower the natural frequency of a pitching mode of said column from the natural frequency of the vehicle and said lower means being adapted to provide high stiffness when said annular surface is contacted by said column.

4. A steering column arrangement for a vehicle comprising:
   (a) a vehicle steering column;
   (b) an upper support means for connecting said column to the vehicle in the area of the instrument panel of the vehicle;
   (c) a lower resilient support means for connecting said column to the vehicle in the area of the toeboard of the vehicle, said lower means having a passage therethrough for the positioning in said passage of said column, said passage being defined at its entrance and exit by spaced, inner peripheral flanges, each flange presenting an innermost surface and a pair of generally oppositely facing side surfaces, the side surfaces of the two flanges which face each other, each being joined at their outer ends by an annular surface extending between said flanges and surrounding said passage, said lower means also having a pair of lateral pads located on generally opposite sides of the passage and extending from said annular surface to contact said column, said flanges contacting and supporting said column and being adapted to provide controlled vertical flexibility to lower the natural frequency of a pitching mode of said column from the natural frequency of the vehicle and said lower means being adapted to provide high vertical stiffness when said annular surface is contacted by said column with said pads providing high lateral stiffness to said column.

5. A steering column arrangement for a vehicle comprising:
   (a) a vehicle steering column;
   (b) an upper support means for connecting said column to the vehicle in the area of the instrument panel of the vehicle;
   (c) a lower resilient support means for connecting said column to the vehicle in the area of the toeboard of the vehicle, said lower means having a passage therethrough for the positioning in said passage of said column, said passage being defined at its entrance and exit by spaced, inner peripheral flanges, each flange presenting an innermost surface and a pair of generally oppositely facing side surfaces, the side surfaces of the two flanges which face each other, each being joined at their outer ends by an annular surface extending between said flanges and surrounding said passage, said lower means also having a pair of lateral pads located on opposite sides of the passage and extending from said annular surface to contact said column, said flanges contacting and supporting said column and being adapted to provide controlled vertical flexibility to lower the natural frequency of a pitching mode of said column from the natural frequency of the vehicle and said lower means being adapted to provide high vertical stiffness when said annular surface is contacted by said column with said pads providing high lateral stiffness to said column;

(d) bracket means for connecting said lower resilient support means to said vehicle in the area of the toeboard of the vehicle.

6. A resilient support adapted for securing a steering column of a vehicle to the vehicle, said support having a passage therethrough for the positioning therein of a column, said passage being defined by an inner peripheral flange presenting an innermost surface and a pair of generally oppositely facing side surfaces, at least one of said side surfaces being joined at its outer end with an annular surface extending away from said flange and surrounding said passage, said flange being adapted to contact a column and to provide controlled flexibility to lower the natural frequency of a pitching mode of the column from the natural frequency of the vehicle and said support being adapted to provide high stiffness when said annular surface is contacted by the column.

7. A resilient support adapted for securing a steering column of a vehicle to the vehicle, said support having a passage therethrough for the positioning therein of a column, said passage being defined at its entrance and exit by spaced inner peripheral flanges, each flange presenting an innermost surface and a pair of oppositely facing side surfaces, the side surfaces of the two flanges which face each other, each being joined at their outer ends by an annular surface extending between said flanges and surrounding said passage, said flanges being adapted to contact a column and to provide controlled flexibility to lower the natural frequency of a pitching mode of the column from the natural frequency of the vehicle and said support being adapted to provide high stiffness when said annular surface is contacted by the column.

8. A resilient support adapted for securing a steering column of a vehicle to the vehicle, said support having a passage therethrough for the positioning therein of a column, said passage being defined at its entrance and exit by spaced inner peripheral flanges, each flange presenting an innermost surface and a pair of oppositely facing side surfaces, the side surfaces of the two flanges which face each other, each being joined at their outer ends by an annular surface extending between said flanges and surrounding said passage, said support also having a pair of pads located on generally opposite sides of said passage and extending from said annular surface inward, said flanges being adapted to provide controlled flexibility to lower the natural frequency of a pitching mode of the column in a direction generally opposite that of said pads from the natural frequency of the vehicle and the support being adapted to provide high stiffness when said annular surface is contacted by the column with said support pads being adapted to provide high stiffness to the column when the column moves in the direction of the pads.

9. A resilient steering column support having an exterior adapted for connection to a vehicle, said support also having a passage therethrough for the positioning therein of a column, said passage being defined at its entrance and exit by spaced inner peripheral flanges, each flange presenting an innermost surface and a pair of oppositely facing side surfaces, the side surfaces of the two flanges which face each other, each being joined at their outer ends by an annular surface extending between said flanges and surrounding said passage, said support also having a pair of pads located on generally opposite sides of said passage and extending from said annular surface inward, said flanges being adapted to provide controlled flexibility to lower the natural frequency of the pitching mode of the column in a direction generally opposite that of said pads from the natural frequency of the vehicle and the support being adapted to provide high stiffness when said annular surface is contacted by the column with said support pads being adapted to provide high stiffness to the column when the column moves in the direction of the pads.

References Cited by the Examiner

UNITED STATES PATENTS

| | | | |
|---|---|---|---|
| 1,483,903 | 2/1924 | Masury | 280—87 |
| 1,707,747 | 4/1929 | Whitten | 280—87 |
| 2,549,925 | 4/1951 | Paton | 74—493 |
| 3,214,994 | 12/1962 | Tolan | 74—490 |

KENNETH H. BETTS, *Primary Examiner.*